United States Patent [19]
Lummus

[11] 4,025,082
[45] May 24, 1977

[54] ICE BLOCK SLED
[75] Inventor: J. Frank Lummus, Martinez, Calif.
[73] Assignee: The Raymond Lee Organization, Inc., New York, N.Y.; a part interest
[22] Filed: Jan. 23, 1976
[21] Appl. No.: 651,895
[52] U.S. Cl. .............................. 280/12 H; 280/12 R
[51] Int. Cl.² .......................................... B62B 13/16
[58] Field of Search ............ 280/12 R, 12 H, 12 K, 280/18; 280/11.1 R

[56] References Cited
UNITED STATES PATENTS

| | | | |
|---|---|---|---|
| 3,176,999 | 4/1965 | Atcherley | 280/12 R |
| 3,442,522 | 5/1969 | Spilhans | 280/11.1 R |
| 3,585,664 | 6/1971 | Thompson | 280/12 H |

FOREIGN PATENTS OR APPLICATIONS

| | | | |
|---|---|---|---|
| 116,660 | 9/1964 | Norway | 280/18 |
| 1,004,487 | 6/1962 | United Kingdom | 280/18 |

Primary Examiner—Robert R. Song
Attorney, Agent, or Firm—Daniel Jay Tick

[57] ABSTRACT

A block of ice has a bottom surface adapted to slide along a supporting surface and a top surface adapted to accommodate a rider and having a depression formed therein for part of the body of the rider, so that it may be used as a sled. A cord is embedded in the ice and extends from both sides thereof to provide handholds for the rider.

4 Claims, 6 Drawing Figures

U.S. Patent  May 24, 1977  4,025,082
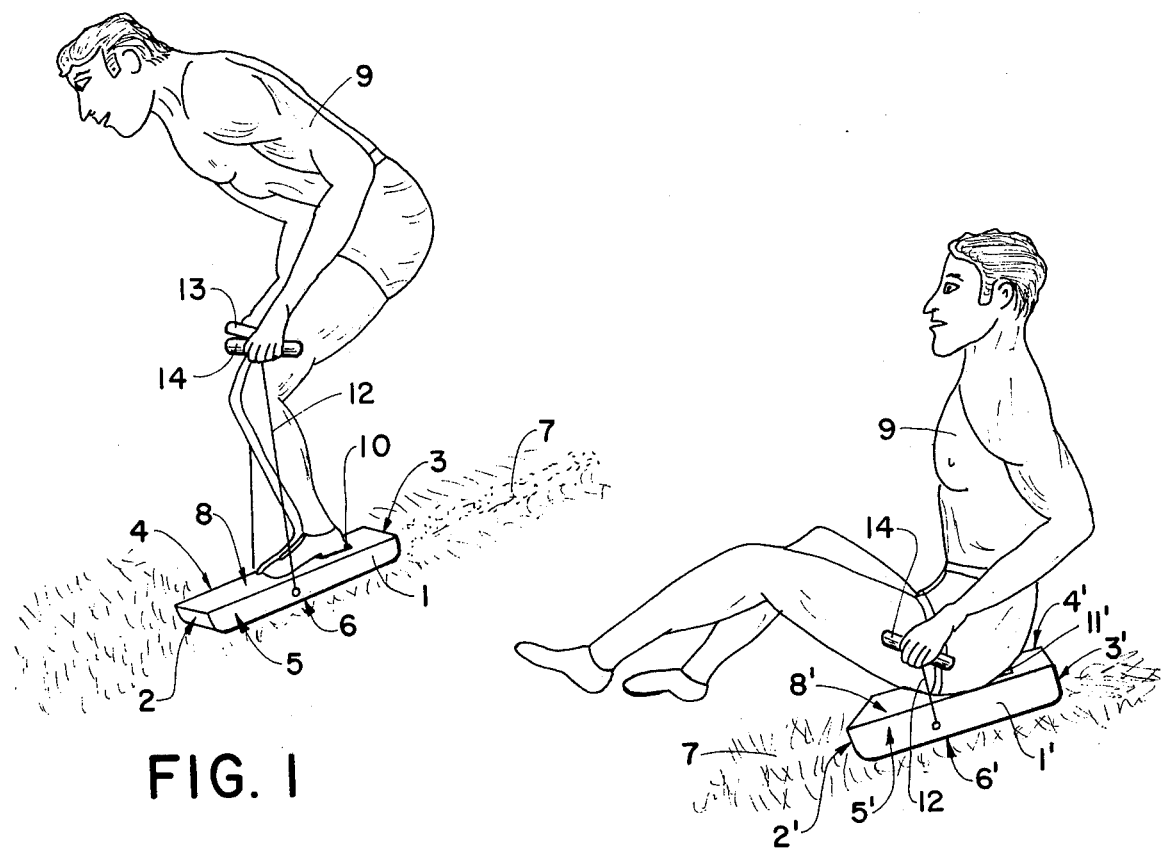
FIG. 1
FIG. 2
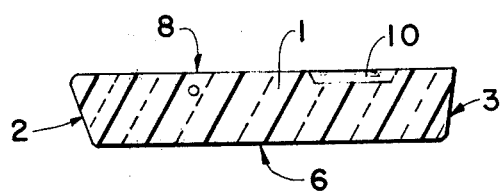
FIG. 3
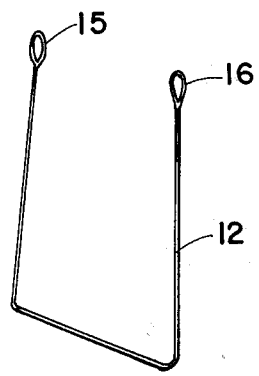
FIG. 5
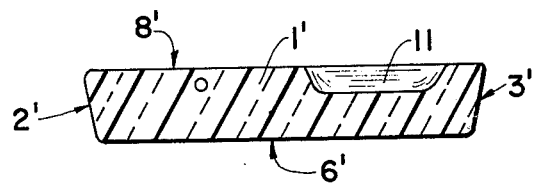
FIG. 4
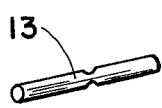
FIG. 6

ICE BLOCK SLED

BACKGROUND OF THE INVENTION

The present invention relates to a sled.

Objects of the invention are to provide a sled of simple structure, which is inexpensive in manufacture, and is produced with facility, convenience and rapidity, used with facility and convenience, and functions as a sled to permit a rider to slide down a hillside or dune completely devoid of snow and/or ice. This permits all types of sledding activities under conditions of warm weather and total lack of snow, and is therefore a source of considerable amusement, enjoyment, exercise and recreation.

BRIEF DESCRIPTION OF THE DRAWINGS

In order that the invention may be readily carried into effect, it will now be described with reference to the accompanying drawings, wherein:

FIG. 1 is a perspective view of an embodiment of the sled of the invention in use;

FIG. 2 is a perspective view of another embodiment of the sled of the invention in use;

FIG. 3 is a cross-sectional view, taken along the length, of the embodiment of FIG. 1;

FIG. 4 is a cross-sectional view, taken along the length, of the embodiment of FIG. 2;

FIG. 5 is a view of an embodiment of the cord of the sled of the invention; and

FIG. 6 is a perspective view of an embodiment of a handle of the cord of the sled of the invention.

DETAILED DESCRIPTION OF THE INVENTION

The sled of the invention comprises a block of ice 1 (FIGS. 1 and 3) or 1' (FIGS. 2 and 4). The block of ice 1 has a front 2, a back 3, a pair of sides 4 and 5, a bottom surface 6 adapted to slide along a supporting surface 7 and a top surface 8 adapted to accommodate a rider 9 (FIGS. 1 and 3).

The block of ice 1' has a front 2', a back 3', a pair of sides 4' and 5', a bottom surface 6' adapted to slide along a supporting surface 7' and a top surface 8' adapted to accommodate a rider 9 (FIGS. 2 and 4).

The block 1 has a pair of adjacent depressions formed in the top surface 8 thereof to accommodate the heels of the shoes on feet of the rider 9. One of these depressions 10 is shown in FIGS. 1 and 3. The other depression is not seen in the views of the drawings. Thus, the sled of the embodiments of FIGS. 1 and 3 is used by the rider standing thereon with his or her heels in the depressions formed in the top surface 8 thereof.

The block 1' has a depression 11 formed in the top surface 8' thereof, as shown in FIGS. 2 and 4, to accommodate the rump of the body of the rider 9. Thus, the rider uses the sled of the embodiment of FIGS. 2 and 4 by sitting on it.

In both embodiments of the invention, a cord 12 (FIGS. 1, 2 and 5) is embedded in the ice and extends from both sides 4 and 5 (FIG. 1) or 4' and 5' (FIG. 2) thereof for providing handholds for the rider 9. Handles are provided at both ends of the cord 12 to facilitate manual gripping by the rider, as illustrated in FIGS. 1 and 2. One embodiment of a handle comprises a length of material 13 of rod-like configuration (FIG. 6) affixed to the cord. Thus, as shown in FIGS. 1 and 2, a length of material 13 of rod-like configuration is affixed to one end of the cord 12 and a length of material 14 of rod-like configuration is affixed to the other end of the cord. The material 13 and 14 may comprise any suitable material such as, for example, wood, plastic, or the like.

Another embodiment of a handle comprises a loop formed in the cord. Thus, as shown in FIG. 5, a first loop 15 is formed in the cord 12 at one end thereof and a second loop 16 is formed in the said cord at the opposite end thereof. The loops 15 and 16 function as handles for the rider 9.

While the invention has been described by means of specific examples and in specific embodiments, I do not wish to be limited thereto, for obvious modifications will occur to those skilled in the art without departing from the spirit and scope of the invention.

I claim:

1. A sled, comprising
   a block of ice having a front, a back, a pair of sides, a bottom surface adapted to slide along a supporting surface and a top surface adapted to accommodate a rider and having depressions formed therein for the heels of the shoes of a rider; and
   a cord embedded in the ice and extending from both sides thereof for providing handholds for the rider whereby the rider rests his entire body on the top surface of the block of ice.

2. A sled as claimed in claim 1, further comprising handle means at both ends of the cord to facilitate manual gripping by the rider.

3. A sled as claimed in claim 2, wherein the handle means comprises a pair of lengths of material of rod-like configuration affixed to the cord.

4. A sled as claimed in claim 2, wherein the handle means comprises a pair of loops formed in the cord.

* * * * *